United States Patent [19]
Leiboff

[11] 3,941,924
[45] Mar. 2, 1976

[54] SIMPLIFIED MULTI-CHANNEL DATA SENSOR SYSTEM

[75] Inventor: Teague N. Leiboff, Redondo Beach, Calif.

[73] Assignee: Northrop Corporation, Los Angeles, Calif.

[22] Filed: Nov. 25, 1974

[21] Appl. No.: 527,128

[52] U.S. Cl. ........ 178/6.8; 178/DIG. 3; 178/DIG. 8; 179/15 A; 325/38 B; 340/347 AD
[51] Int. Cl.² .. H04N 7/12; H04J 3/02; G08C 15/12
[58] Field of Search........... 178/6.8, DIG. 3, DIG. 8; 179/15 A; 325/38 B; 340/347 AD

[56] References Cited
UNITED STATES PATENTS

| | | | |
|---|---|---|---|
| 3,585,440 | 6/1971 | Lee | 178/6.8 |
| 3,755,624 | 8/1973 | Sekimoto | 178/DIG. 3 |
| 3,800,225 | 3/1974 | Meares | 325/38 B |
| 3,804,976 | 4/1974 | Gard | 178/DIG. 8 |

Primary Examiner—Howard W. Britton
Attorney, Agent, or Firm—Edward A. Sokolski

[57] ABSTRACT

A single channel transmission and recording system for a scanner having a multi-channel array of dectors having a single delta modulator in the transmission unit and a single delta demodulator in the receiving unit. A plurality of analog signals, such as video signals sensed by infrared detectors, are each fed to an associated channel having an associated switch circuit. A suitable switch logic generator samples the switches in successive ascending order and subsequently in successive descending order. The sampled analog signals of each channel are fed to a signal delta modulator which converts them to a serial train of digital signals. A synchronizing code generator generates a synchronizing code word which is transmitted with the serial train of digital signals to a receiving station where the serial train of digital signals is reconverted to an analog signal similar to the sampled analog signals for display on a suitable device such as a cathode ray tube. A decoder decodes the synchronizing code word to initiate the frames of scan of the cathode ray tube and a suitable counter responsive to the decoder controls the sweep of the frames of scan in accordance with the sampling of each of the channels in successive ascending order and subsequently in successive descending order.

14 Claims, 8 Drawing Figures

SIMPLIFIED MULTI-CHANNEL DATA SENSOR SYSTEM

BACKGROUND OF THE INVENTION

This invention relates to a single channel transmission and recording system for a multi-channel sensor. More particularly, it relates to a multiplexer for sampling a plurality of analog signals in a predetermined sequence and converting them to digital signals by a single delta modulator for transmission.

Various prior art devices have been used for sensing analog data and transmitting it to a remote station for analysis and storage. More particularly, such devices may have application in detecting electro-optical or infrared energy using analog sensors which are responsive to the shape of some terrain or object. The information obtained by these analog sensors is processed to obtain the maximum resolution of the object on the ground. Recent advances in aerospace vehicles and sensor technology make the consideration of reconnaissance systems with extremely high data-acquisition rates possible. It is frequently necessary to transmit this reconnaissance data to a remote location for evaluation.

Ordinarily, the analog signals are digitized for transmission and processing. The conversion of the analog signals to digital signals has a number of advantages. The digital format allows transmission of information over long distances without deterioration, since digital signals, unlike analog signals can be regenerated with only small probability of error. Since the signals are in digital form, they are not subject to phase shifting and other distortions so common with analog signals. The transmission of the signals in digital form also makes the signal to noise ratio at the receiver less critical.

Furthermore, digital information may be transmitted economically by time-division multiplexing. The frequency-division multiplexing, commonly used in transmission of analog information is thereby avoided. This avoids the complex filters which are required in frequency-division multiplexing since time-division multiplexing functions can be accomplished with digital switching circuitry. The use of digital circuitry with its relatively simple mode of switching permits fully electronic operation of the transmission systems. Thus, problems in transmission of analog information such as cross talk and mechanical contacts is avoided.

The encoding of analog information into digital information may be readily obtained by sampling the analog information at regular discrete intervals and coding the amplitude into a digital format. This procedure is commonly referred to as pulse code modulation (PCM). The art of pulse code modulation has been developed to the point where analog signals can be sampled successively and the differences transmitted. This technique is known as differential pulse-code modulation. A special form of this technique is known as delta modulation. This scheme provides for encoding of the differences in the slope of the analog signal as well as the differences in amplitude to thereby improve the coding properties of the encoders. The use of delta modulation for encoding is well described in the article by Schindler, *Delta Modulation*, IEEE Spectrum, Oct. 1970, p. 69.

It has been proposed to use a plurality of delta modulators each associated with a corresponding analog sensor detector for sensing infrared or electro-optical information video signals. Such a system is mounted on an in-flight data transmission system to detect an object on the ground. In such a system, the analog signal received by each of the sensors is first individually converted from analog to digital form by sampling, using a plurality of delta modulators each associated with one of the sensors. The outputs of the delta modulators are multiplexed and transmitted to a receiver station where they are decoded, demultiplexed and converted back to analog information which may be displayed and recorded by suitable means. The requirement of an individual delta modulator for each channel renders this method expensive and cumbersome.

SUMMARY OF THE INVENTION

The present invention provides transmission of information sensed by the analog detectors using a single delta modulator. To attain this, the sensors are sampled in successive ascending order and subsequently in successive descending order. The invention relies on the inherent function of delta modulators of comparing each input signal to the previous input signal. The continuous sampling of signals having pictorial information which is physically adjacent to the pictorial information of the previously sampled signal enables the use of a single delta modulator to convert each of the analog signals having pictorial information to a serial train of digital signals.

The use of one delta modulator for a relatively large plurality of sampling channels, rather than one delta modulator for each channel, provides substantial savings in cost of equipment. For example, in a system having 128 channels, the use of a single delta modulator for all the channels, rather than one delta modulator for each channel, reduces the cost of equipment by the price of 127 delta modulators. It is apparent that the reduced number of delta modulators thereby increases the reliability of the system. Furthermore, the reduced number of delta modulators reduces power consumption as well as space consumption.

The analog signals may be in the form of video input signals, which are essentially analog signals containing pictorial information. The signals are picked up by an electro-optical detector such as a radiometer, a low light level TV scanner or any type of infrared or video scanner. The technique for detection may be any well known method such as that disclosed in U.S. Pat. No. 3,708,666 to Barhydt.

Each detector transmits the received analog signal containing pictorial information to an associated switch circuit. The switching circuitry may be a plurality of any standard high speed switches such as MOS-FET switches.

The switches are activated in successive ascending order and subsequently in successive descending order by switch logic generator means. The switch logic generator means may be any standard electronic counter comprising the desired number of flip-flops. In the preferred embodiment it is shown by a divide-by-twelve counter. The flip-flops are coupled to a plurality of AND gates and OR gates in a logic configuration to provide the desired sequence of activation to the switch circuits.

The switch logic generator samples the switches at an information rate which is at least twice the resolution cutoff frequency of the analog data rate of each channel to thereby conform with the Nyquist criteria as more fully explained in the article by Schindler cited above. Thus, for n detectors, the clock rate of the system must be a minimum of $2nf_c$ where $n$ = the number of channels and $f_c$ = the cutoff frequency of each channel.

The start of each frame of scan is marked by a synchronizing signal, commonly referred to as a sync pulse, generated by the scanner. The sync pulse activates a synchronizing code generator to generate a unique code word to subsequently synchronize the display of the pictorial information of the analog signals in a frame of the scan in accordance with the detection of the pictorial information in the analog signals in a frame of scan.

The sync pulse subsequently activates the switch logic generator to begin the sampling of the switches in the predetermined order described above. The sampled analog signals transmitted by the switches, and having pictorial information detected by the detector, are fed to the single delta modulator.

A delta modulator is basically an analog to digital converter having an electronic feedback system and a switch which is periodically closed to thereby quantize the output. The delta modulator may be in any preferred form such as that described in the Schindler article, cited above, or in U.S. Pat. No. 3,739,083, of which I am a joint inventor, and assigned to the assignee of the present invention.

Briefly, the sampled analog signals are fed to a differencing amplifier. The output of the differencing amplifier is fed to a flip-flop. The flip-flop is activated by a clock pulse at a frequency equal to the sampling frequency of the switches. The output of the flip-flop is integrated by means of an integrating circuit and fed to the input of the differencing amplifier for a comparison with the input sampled analog signal.

If the signal reconstructed and fed back to the differencing amplifier is more positive than the input analog signal from the sampled switch, the output of the comparator is equivalent to a digital binary one. The flip-flop is thereby set to generate a binary one output. If the signal reconstructed and fed back by the integrator is more negative than the input analog signal from the sample switch, the output of the comparator is equivalent to a digital binary zero. The flip-flop, which was reset by the previous clock pulse remains in the binary zero state to yield a binary zero output.

Thus, when the slope of the analog input signal is positive, the digital output signal of the flip-flop has a binary "one" value. Correspondingly, when the slope of the analog input signal is negative, the digital output signal is a binary "zero". When the slope of the analog input signal is zero, the digital signal comprises equal "ones" and "zero" pulses corresponding to the clock pulses to provide an average of zero. The output of the delta modulator thus is a serial train of digital pulses, each of these pulses being indicative of the polarity of the slope of the video signals, the sum of such pulses for a period of time being indicative of the magnitude of the slope.

The digital output of the delta modulator is fed to the synchronizing code generator which generates the synchronizing code word, which, as indicated above, initiates each frame of scan of video signals at the receiving station. The synchronizing code word, which is a series of digital pulses, precedes each series of digital pulses which constitute a converted frame of sampled video signals.

The frame of digitized video signals, each preceded by the synchronizing code word, are fed to a modulator/transmitter which modulates the pulses on the carrier of a suitable radio transmitting unit. The transmitting unit transmits the data signals over an appropriate communications channel to a receiver/demodulator. The receiver/demodulator receives and demodulates the signals to enable them to be utilized for display and recording.

The receiver/demodulator applies each frame of digital pulses to a frame synchronizer decoder which extracts the sync code word to initiate the display of the video information in the frame of signals on the screen of a suitable display means such as a cathode ray tube (CRT). The received train of digital signals is also applied to a single delta demodulator which converts the digitized video signals back to an analog signal similar to the sampled analog signals which were passed by the analog signal gates from the detector array to the single delta modulator in the transmitting station. The reconstructed video signal is coupled through a suitable filter to the grid of the CRT to control the intensity of the beam swept across the face of the tube.

The frame synchronizer decoder transmits a signal, in response to the detection of the sync code word, to a horizontal oscillator which is connected to a pair of vertical deflection plates in the CRT to control the horizontal sweep of the frame of video signals. The decoder also transmits a reset signal to an up-down counter which controls the voltage applied to a pair of horizontal deflection plates in the CRT to thereby control the vertical sweep of the frame of video signals. The up-down counter provides an output which increases in successive steps and subsequently decreases in successive steps in accordance with the sampling by the switch logic generator in successive ascending order and subsequently in successive descending order.

The CRT thereby provides a display of the pictorial information detected by the scanner detector array in accordance with the relative physical location associated with each succeeding detected video signal transmitted by the analog signal gates from the detector array to the delta modulator. The CRT thereby provides a faithful reproduction of the object or the terrain scanned by the scanner detector array. The picture displayed on the CRT may be recorded by any suitable recording device such as a flying spot scanner film recorder.

It is therefore an object of this invention to provide an improved technique for multiplexing a plurality of analog sensors.

Another object of the present invention is to convert analog information from a plurality of video sensors to a single channel of digital information.

A further object is to provide improved techniques for digitally processing video signals for transmission using a single delta modulator.

Yet another object is to provide means for sampling a plurality of analog signals containing pictorial information in successive ascending order and subsequently in successive descending order to enable the conversion thereof to digital signals by a single delta modulator.

Still another object is the provide means for decoding and displaying a serial train of digitized video signals in accordance with the sequence of sampling of the signals.

Still a further object is to provide means for displaying on a CRT an analog video signal similar to a plurality of analog video signals sampled in successive ascending order and subsequently in successive descending order in accordance with the sampling thereof.

Other object, advantages and novel features of the present invention will become apparent from the following detailed description of the invention when considered in conjunction with the accompanying drawings.

DESCRIPTION OF THE PREFERRED EMBODIMENT

Figure 1:
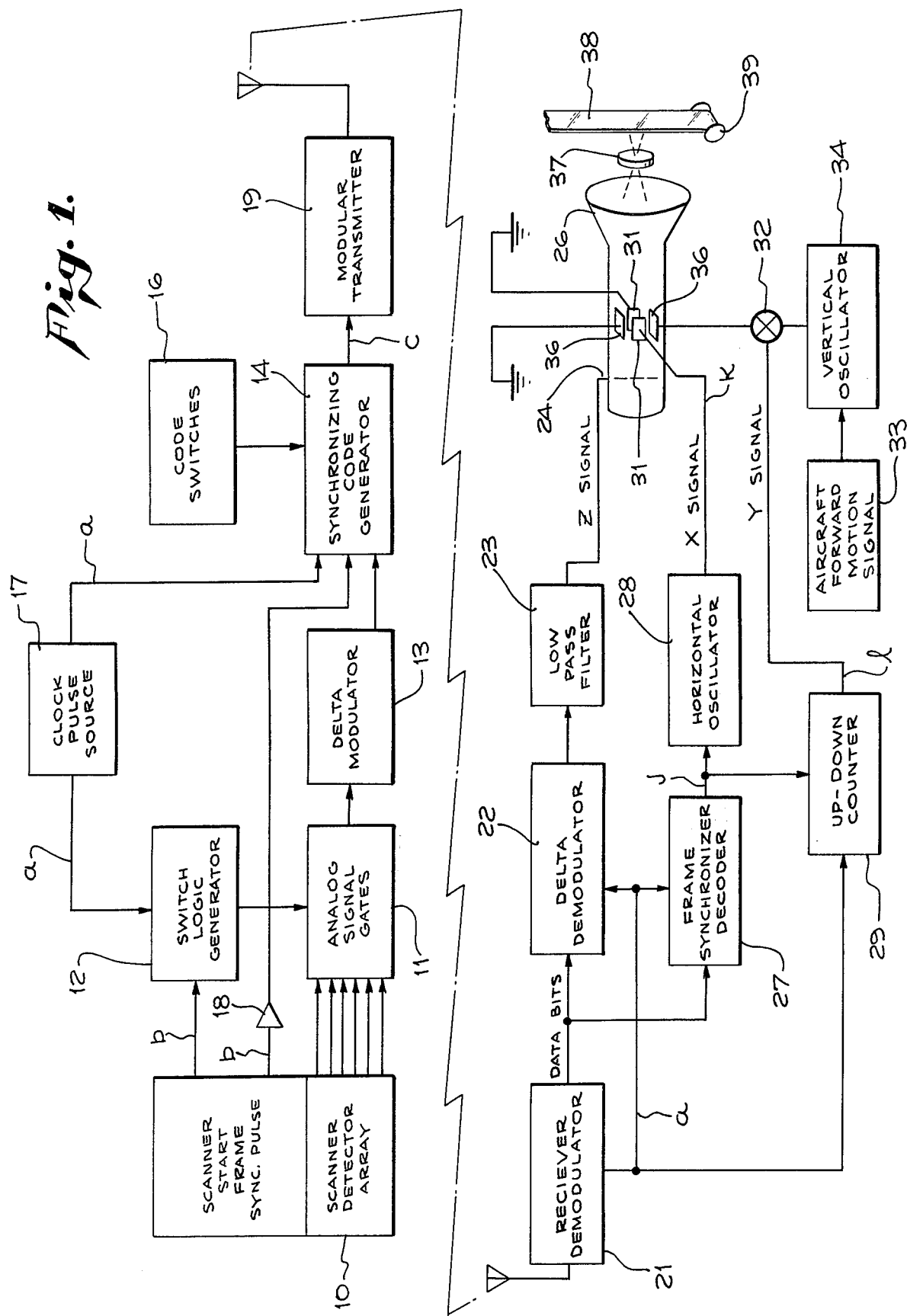
FIG. 1 is a block diagram illustrating the basic elements of the system of the present invention.

Referring to FIG. 1, a block diagram illustrating the basic elements of the system of the invention is shown. A clock pulse source 17 generates a plurality of clock pulses $a$, shown in the timing diagram of FIG. 8, for synchronizing the operation of the elements of the system. A scanner detector array 10 feeds a plurality of analog video signals each through an associated channel to a plurality of analog signal gates 11. Each of the gates is sampled sequentially by a switch logic generator 12 which is activated initially by a start frame sync pulse $b$, shown in the timing diagram of FIG. 8, generated by the scanner 10 at the beginning of each frame of scan. The start frame sync pulse is suitably delayed for purposes of synchronization of the timing. As will be explained more fully hereinafter, the analog signal gates 11 are sampled in successive ascending order and subsequently in successive descending order.

Each of the signals generated by the gates 11 is fed to a single delta modulator 13. The delta modulator encodes the analog video signals in digital form to generate a pulse train of digitized analog signals. The train of digital signals provides an indication of the magnitude and direction of the slope of the sampled analog video signals.

The train of digital signals is transmitted to a synchronizing code generator 14 which generates a code word which precedes the train of digital pulses. As will be explained subsequently, the code word synchronizes the display of each frame of scan, at the receiving end of the system with the sensing of the frame of scan at the transmitting end. The code word is determined by the arbitrary setting of a plurality of code switches 16. The synchronizing code generator is initially activated by the sync pulse $b$ from the scanner 10 and inverted by the inverter 18 to generate the code word.

The train of clock pulses $a$ from clock pulse source 17 steps the synchronizing code generator to generate the code word at the beginning of each frame of scan. The clock pulses then step the switch logic generator 12 to sample each of the channels of the analog signal gates 11 in successive ascending order and subsequently in successive descending order for the remainder of the frame of scan. The synchronizing code generator thereby provides frames of digital pulses each beginning with a synchronizing code word and followed by digitized video signals which were converted from analog to digital form by the delta modulator 13.

The train of digital signals is modulated on a radio frequency carrier wave by a suitable modulator/transmitter 19. The signals are transmitted to a receiving station and initially received by a receiver/demodulator 21. The receiver/demodulator 21 extracts the digital signals from the carrier wave in a manner well known in the art.

Means are provided at the receiving station for processing the train of digital information to restore it to its initial analog form for display and storage. This is achieved by converting the digital signals to analog video signals and displaying them on a suitable display device, such as a cathode ray tube (CRT) in accordance with the sampling of the signals at the transmission station.

The demodulation is obtained by a single delta demodulator 22 which converts the serial train of data bit pulses to an analog video signal similar to the analog video signals sampled by analog signal gates 11. The pulses are transmitted through a low pass filter 23 to filter out the extraneous high-frequency signals. The reconstructed analog signals are transmitted to a grid terminal 24 of a CRT 26 for modulating the intensity of the sweep of electron beams across the tube.

Means are provided for controlling the sweep of electron beams across the tube of the CRT 26 in accordance with the sampling of the signals at the transmission station. A frame synchronizer decoder 27 decodes the synchronizing code word to generate a recorder start pulse $j$ to control the horizontal and vertical sweep of the transmitted frames of video signals to provide a pictorial display on the screen in accordance with the sampling by the analog signal gates 11 of the pictorial information detected by the detector array 10.

The code word is transmitted to one input of the decoder 27 with the stream of data bits. Clock pulses are also transmitted to the decoder 27 from the receiver 21 to operate the decoder 27 at a synchronous rate with respect to the delta demodulator 22. When the decoder 27 detects a code word, it initiates a frame of scan of video data by generating a recorder start pulse $j$.

The output of the decoder 27 is fed to both a horizontal oscillator 28 and an up-down counter 29. The horizontal oscillator 28 generates an X signal $k$ which is transmitted to a pair of deflection plates 31 to control the horizontal sweep of the electron beam. When the present invention is used for aircraft reconnaissance, the horizontal sweep corresponds to the horizontal direction perpendicular to the direction of flight of the aircraft.

Figure 8:
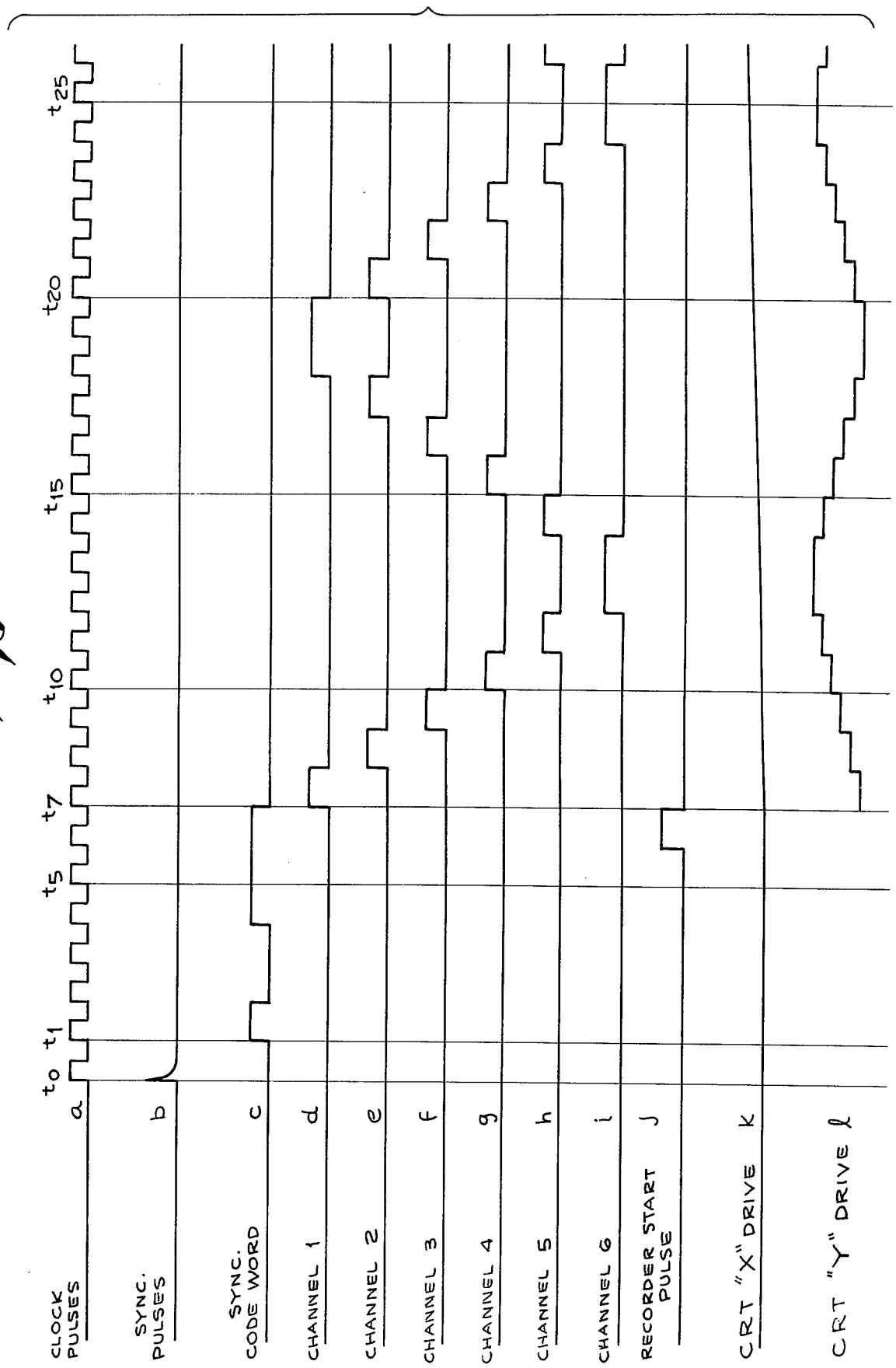
FIG. 8 is a timing diagram illustrating a series of waveforms developed by various elements of the present invention.

The up-down counter 29 controls the vertical movement of the beam in accordance with the sampling by the switch logic generator 12 of analog gates 11. The output of the up-down counter 29, shown as 1 in FIg. 8, is applied to an analog summing device 32. An aircraft forward motion signal generator 33 measures the ratio of the forward ground velocity of the vehicle to the altitude of the vehicle to obtain a V/H signal. This signal is fed to a vertical oscillator 34 to control the frequency of the oscillator in proportion to the V/H signal. The output of vertical oscillator 34 is fed to a second input of the analog summing device 32 to vary the spacing of the Y signal between horizontal sweeps in proportion to the variation of V/H. The Y signal is controlled by the pair of deflection plates 36. When the present invention is used for aircraft reconnaissance, the vertical Y signal on the face of the CRT corresponds to the horizontal forward direction of the aircraft.

The aircraft forward motion signal generator 33 is particularly useful if the present system is used for aircraft reconnaissance and the V/H varies considerably from one reconnaissance to the next, or even during a particular reconnaissance. Thus, if the aircraft is flying either relatively fast or relatively close to the ground, and the V/H is relatively high, the signal generator 33 produces a relatively large signal to cause the vertical oscillator 34 to provide a relatively large signal to cause the vertical oscillator 34 to provide a relatively large voltage to the Y plates 36. If, on the other hand, the vehicle is travelling at a relatively slow forward velocity or at a relatively high altitude, and the V/H is relatively low, signal generator 33 provides a relatively low voltage to vertical oscillator 34 to reduce the spacing between horizontal sweeps. Thus, with this correction in spacing of horizontal sweeps so as to correspond with the instantaneous V/H, the CRT gives an accurate picture of the object or terrain scanned.

The intensity modulated sweep on the CRT may be focused by a lens 37 on a moving strip of sensitive recording film 38 which is taken up by a suitable spool 39. Alternatively, the picture on the CRT may be recorded by any suitable flying spot scanner film recorder.

The system is preferably used to obtain a picture on the screen of the CRT of the terrain below an aircraft. Surveillance of the terrain is obtained by scanner means having a plurality of channels each having an electro-optical detector associated therewith. The array of detectors detect optical energy in the form of infrared radiation reflected from objects on the ground to generate video signals. Such a system may be used in conjunction with a side-looking airborne radar search system for searching large land and coastal areas in daylight, darkness or inclement weather to detect moving targets. The scanner may be any suitable type such as that disclosed in U.S. Pat. No. 3,708,666 to Barhydt.

The array of detectors of the scanner are preferably arranged in a line parallel to the forward direction of the aircraft or may be staggered slightly from a line parallel to the forward direction of the aircraft with appropriate delay circuits coupled in between to render the detectors effectively parallel to the forward direction of the aircraft taking into account the forward movement of the aircraft. A rotating scanning mirror is mounted on suitable bearings to rotate on an axis which is substantially parallel to the flight direction. The plurality of detectors are positioned in a line parallel to the axis of the rotary scanning mirror to receive energy reflected from the scanning mirror. The energy sensed by the detectors is effectively processed by the present invention to generate a picture on the screen of the CRT. The horizontal forward direction of the aircraft which is parallel to the array of detectors, corresponds to the Y direction on the CRT. The horizontal direction perpendicular to the forward movement of the aircraft, which is perpendicular to the array of detectors, corresponds to the X direction on the CRT.

The scanner is preset to generate a sync pulse $b$, shown in the timing diagram of FIG. 8, as one of the surfaces of the rotating scanning mirror is rotated to a position wherein it begins to reflect the terrain or object sought to be displayed. The sync pulse $b$ is inverted by invertor 18 and applied to the synchronizing code generator 14 to generate the synchronizing code word, which signals the beginning of each frame of scan. The sync pulse is also applied to the switch logic generator at the same time. As will be explained subsequently, the switch logic generator has suitable delays to prevent the sampling of the gates 11 until the code word is generated.

The synchronizing code generator may be any suitable device for generating an arbitrary sequence of binary ones or zeros which when detected by the frame synchronizer decoder 27, begins a frame of scan. The display of the video signals on the CRT is therefore in accordance with the sampling by the switch logic generator 12 of the video signals transmitted by gates 11 from the detector array 10 to the delta modulator 13. A unique noise sequence of pulses is thereby generated by the code generator 14 which, when sensed by the decoder 27 signals the beginning of a frame of video data. It is therefore very important that the code word be detected by the decoder to produce a faithful reproduction of the associated frame of video data on the CRT 26.

Figure 4:
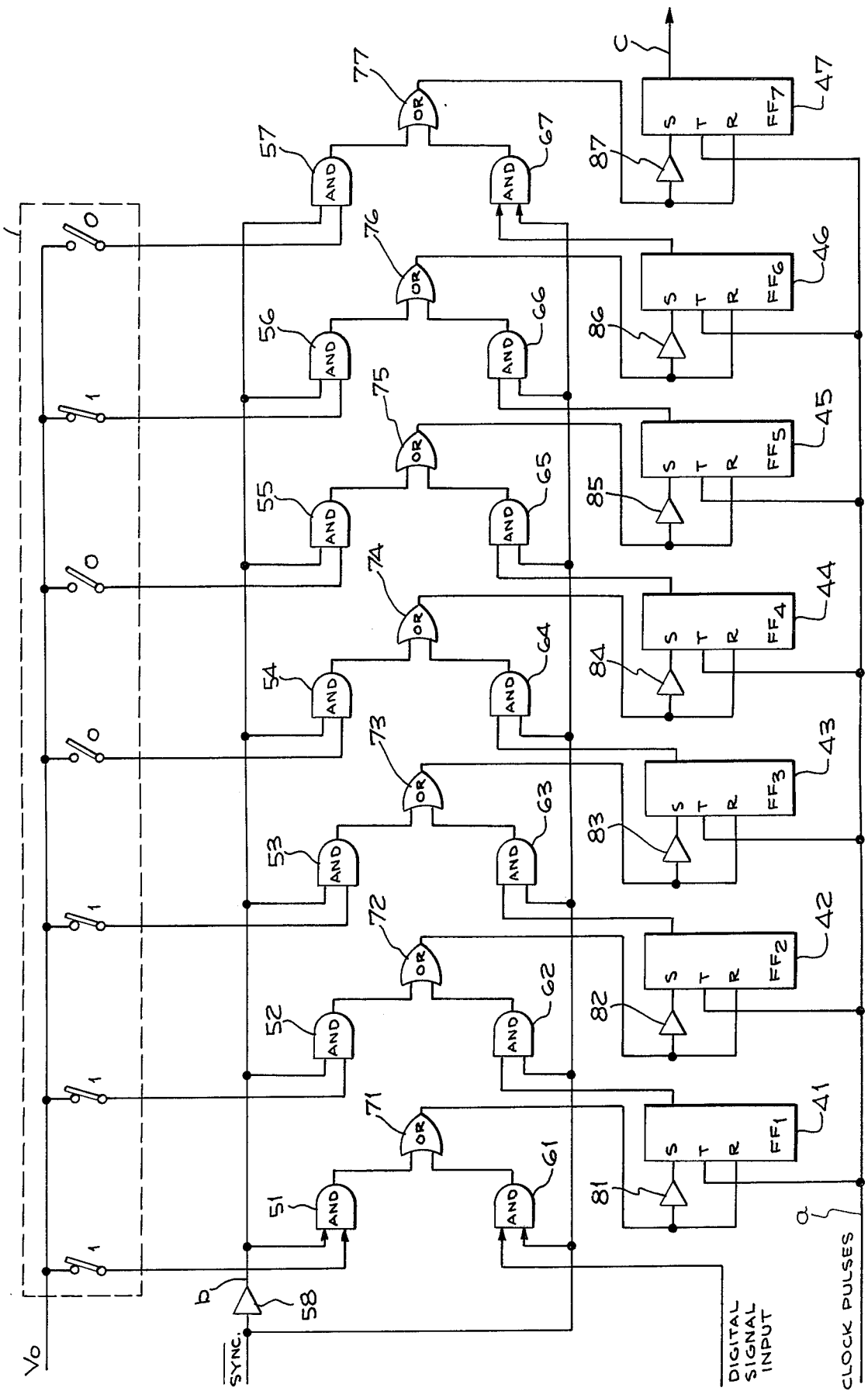
FIG. 4 is a functional block diagram of a synchronizing code generator that may be utilized in the system of the present invention.

In the preferred embodiment, the synchronizing code generator is shown as a seven stage shift register in FIG. 4. The code generator 14, however, may be constructed of a register having any suitable number of stages sufficiently great to reduce the probability of a false dismissal of data to a sufficiently low level so that the probability of losing one or more frames of data associated with the sync signal is insignificantly small.

The code word may be selected by any arbitrary setting of the plurality of binary code switches 16 with each switch associated with one of the stages of the shift register. In the exemplary embodiment shown in FIG. 4, the code word is shown as 1110010. It should be emphasized that the code word may be randomly selected and the code generator may have any number of stages determined by the desired reduction in error probability.

In the synchronizing code generator of the preferred embodiment shown in FIG. 4, each stage has an associated flip-flop 41 through 47 as shown. Each of the stages has an associated AND gate 51 through 57 having one input from the associated code switch 16 and a second input from the sync pulse line which is inverted a second time by inverter 58 (after having been inverted a first time by inverter 18), to provide a sync pulse $b$, as shown in FIG. 8.

Each of the stages contains a second AND gate 61 through 67 having one input from the sync pulse generator as inverted by inverter 18. The second input of AND gate 61 is the digital signal input from the delta modulator 13. The second input of each subsequent AND gate 62 through 67 is from the output of the flip-flop associated with the preceding stage as shown. Each pair of AND gates associated with each of the stages is coupled to an associated output OR gate. The OR gates are identified as 71 through 77.

In the operation of the scanner, a sync pulse is generated by the scanner, at the point of time when a surface of the rotating mirror is focused on the terrain sought to be surveyed. The sync pulse is transmitted through inverter 18 to the synchronizing code generator 14 to begin the generation of the synchronizng code word.

The inverted sync pulse is inverted once more by inverter 58 and applied to each of the AND gates 51 through 57 for the short time duration of the sync pulse, as shown in FIG. 8(b). The other input to each of the AND gates 51 through 57 is a binary 1 or binary 0, in accordance with the position of the associated switch of the code word switches 16. Each of the AND gates 51 through 57 is thereby enabled or disenabled, depending upon whether the associated code word switch is in the binary 1 or binary 0 state.

Thus, the output of each of the AND gates 51 through 57 is transmitted through the associated OR gate 71 through 77 to an associated inverter 81 through 87 of the associated flip-flop 41 through 47 which in turn is coupled to the set input of the associated flip-flop. The output of each of the OR gates 71 through 77 is also coupled to the reset input of the associated flip-flop. Each flip-flop 41 through 47 is thereby set in accordance with the setting of the associated code switch 16.

The AND gates 62 through 67 each have one input which is activated by the negation sync pulse as shown. The other input to each of the AND gates 62 through 67 is either activated or deactivated according to the setting of the flip-flop of the preceding stage. The clock pulses are coupled to the inputs of each of the flip-flops 41 through 47 so that at each clock pulse time, each of the flip-flops transmits its output to the next subsequent stage in a manner well known in the art. The synchronizing code generator thereby generates a train of pulses at the output of flip-flop 47 having a combination of ones and zeros representing the synchronizing code word as shown in FIG. 8 (c).

Figure 2:
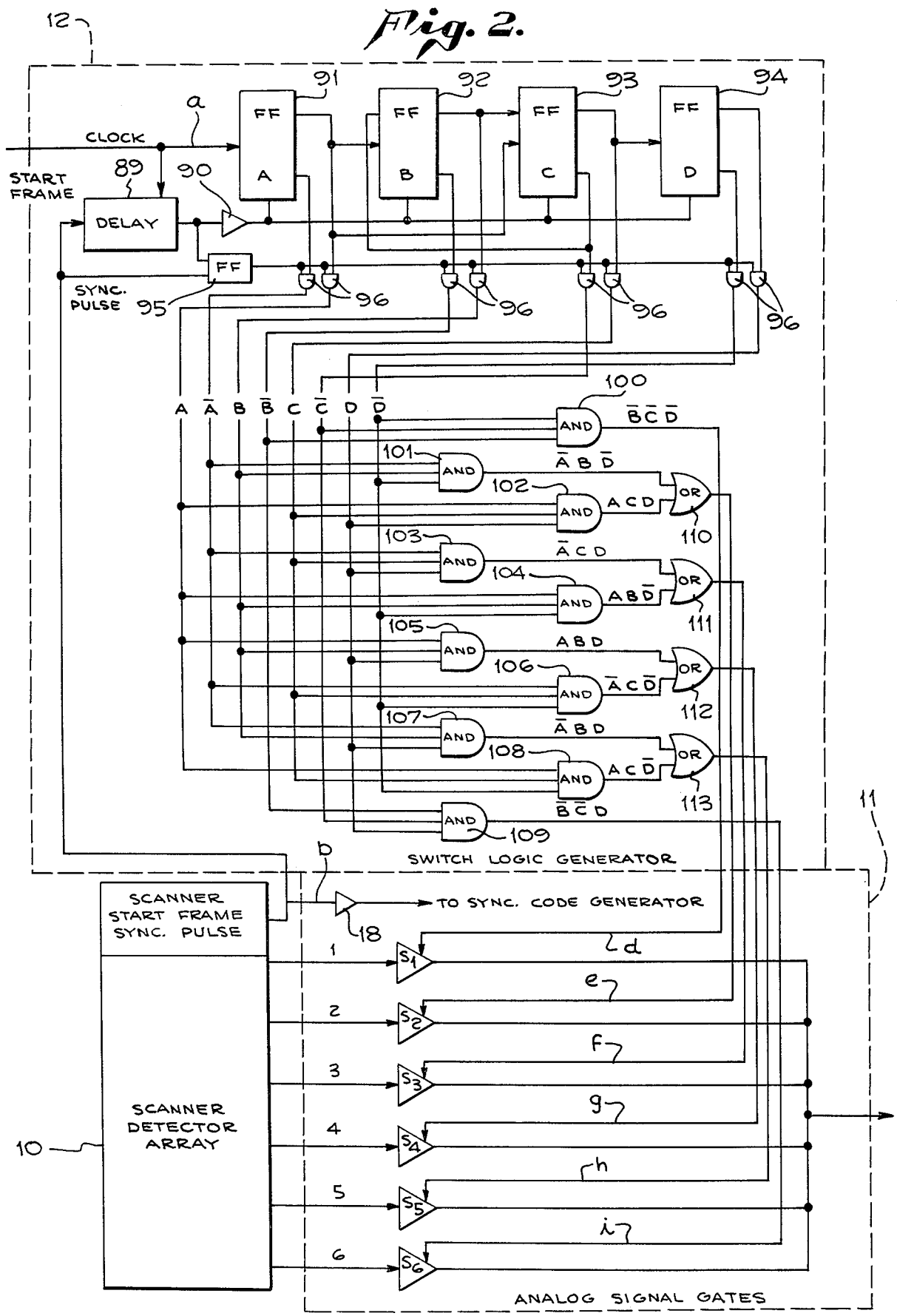
FIG. 2 is a functional block diagram of a switch logic generator and a set of analog signal gates that may be utilized in the system of the present invention.

The sync pulse $b$ is also applied to the switch logic generator 12, shown in greater detail in FIG. 2. The switch logic generator 12 generates the sampling pulses $d$ through $i$ on channels 1 through 6 respectively, as shown in the timing diagram of FIG. 8. It thereby provides sequential sampling of the analog signal gates from the lowest order to the highest order and subsequently from the highest order to the lowest order. The switch logic generator may be any suitable counter means. In the preferred embodiment it is shown as a divide-by-twelve counter.

The sync pulse $b$ is applied to a delay means 89 which may be any suitable delay device such as a shift register. The delay means delays the sync pulse for a period of time equal to the number of clock pulse times required to generate the code word. The sync pulse is inverted by inverter 90 to reset the flip-flops 91 through 94 of the switch logic generator.

The sync pulse is also applied to a flip-flop 95 having an output coupled to a series of AND gates 96 which effectively inhibit the operation of the switch logic generator until the delay means 89 generates an output pulse to reset flip-flop 95 to thereby enable gates 96.

This inhibiting of gates 96 while the code word is being generated prevents the transmission of video signals while the code word is being generated to thereby avoid confusion in the transmitted signal between the bits of the code word and the bits of the digitized video signals.

The flip-flops 91 through 94 are coupled through the gates 96 to a sequence of AND gates 100 through 109 which, in turn, are coupled to OR gates 110 through 113 as shown. It will be apparent to anyone having ordinary skill in the art that the output flip-flops 91 through 94 may be coupled to the inputs of gates 100 through 109 in any logic configuration to provide any desired sequence of generation of pulses on channels 1 through 6. Furthermore, the switch logic generator may be expanded with any additional number of flip-flops, AND gates and OR gates to accommodate any number of analog signal channels.

In the operation of the switch logic generator, a sync pulse $b$, after being suitably delayed by delay 89 and inverted by inverter 90 resets the flip-flops 91 through 94. The gates 96, which were inhibited between the beginning of $t_0$ and the end of $t_6$ are enabled by flip-flop 95 in response to a signal from the delay at the end of $t_6$.

At clock pulse time $t_7$, a clock pulse is applied to flip-flop 91 to generate a binary ones at the A output and a binary 0 at the A output. At this time, the output of flip-flops 92, 93 and 94 are B C D which is the logic requirement for the generation of an output pulse by AND gate 100. The output pulse shown as $d$ in FIG. 8 is transmitted to switch $S_1$ to permit an analog video signal from detector array 10 to be passed through switch $S_1$ for the period of $t_7$.

At clock pulse time $t_8$, a clock pulse is again applied to flip-flop 91 to change the output states of flip-flop 91. Since the A output of flip-flop 91 is connected to the flip-flop 92, flip-flop 92 changes state. Flip-flop 93 and 94 remain unchanged. It is therefore seen that the logic requirements of the transmission of a signal through AND gate 101, A B D, are satisifed. AND gate 101 thereby is enabled to transmit a pulse shown as $e$ in FIG. 8, through OR gate 110 to switch $S_2$ to permit an analog video signal from detector array 10 to be passed through switch $S_2$ for the period of $t_8$.

It will be apparent from following the logic of the rest of the AND gates 102 through 109 that each succeeding clock pulse enables the switch associated with each succeeding channel of the analog signal gates in successive ascending order and subsequently in successive descending order as shown in FIGS. $f$, $g$, $h$, and $i$ of FIG. 8. Thus, each switch transmits the video signal detected by the associated detector for the clock period during which the switch is enabled by the switch logic generator.

It is noteworthy that the end channels, 1 and 6, are activated for two clock pulse times, after the sampling of the first channel. The reason for activating the two end channels for two time periods is to provide an equal average trace intensity in the horizontal direction for each frame of scan. This prevents the trace at the outer edges of each frame of scan from being lighter when displayed on the CRT.

Although the preferred embodiment discloses six channels, it should be emphasized that the present invention may be constructed to accommodate a plurality of analog video signal gates having any number of channels. The preferred embodiment is shown with only 6 channels for simplicity purposes only.

Figure 3:
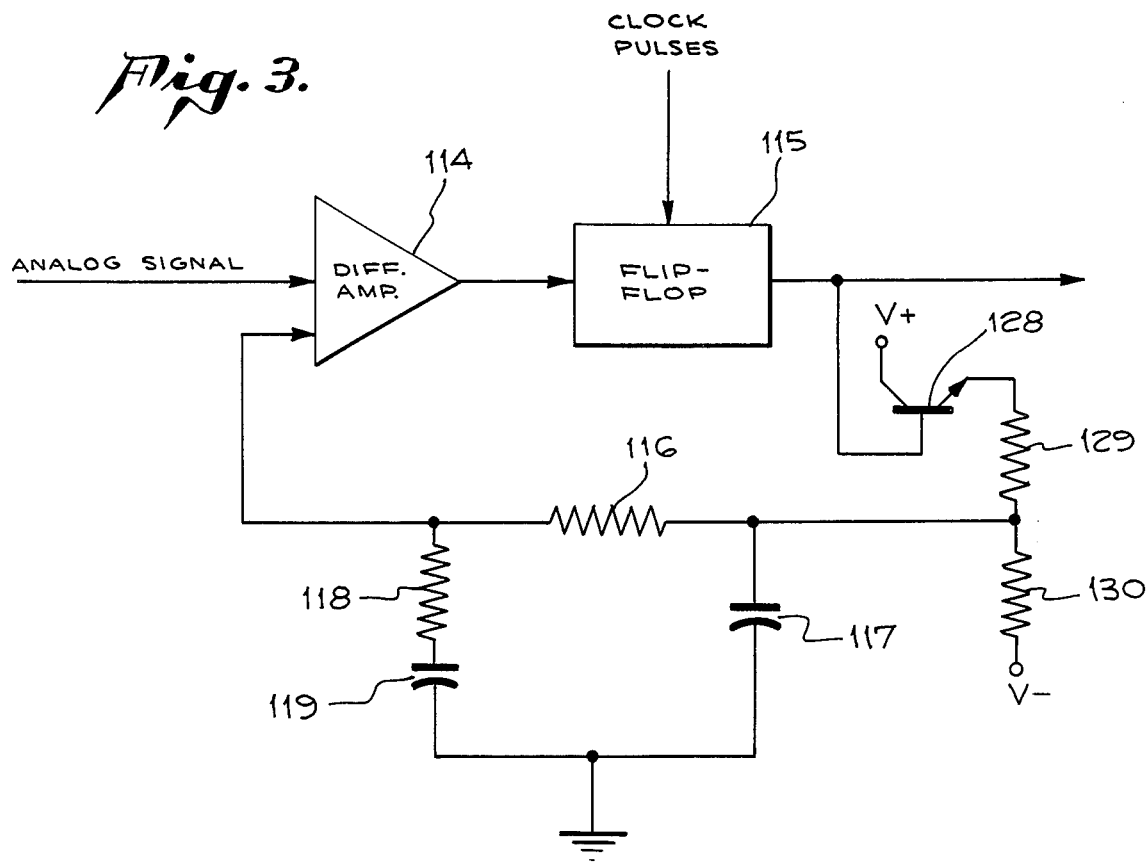
FIG. 3 is a functional block diagram of a delta modulator that may be utilized in the system of the present invention.

The video outputs of the six channels are transmitted to delta modulator means 13. In the preferred embodiment, the delta modulator is shown in FIG. 3. The delta modulator however may be in any preferred form such as that described in the Schindler article, cited above, or in U.S. Pat. No. 3,739,083.

The video signals are fed to a differencing amplifier 114. The output of the differencing amplifier is fed to a flip-flop 115. The flip-flop is activated by clock pulses from the clock pulse source 17. The output of the flip-flop is a series of digital pulses indicative of the magnitude and direction of the input signals.

In order to perform the delta modulation, the output of the flip-flop is reconstructed and fed back to the input to be compared by the differencing amplifier with the next video signal. The feedback circuit has a transistor switch 128 having reference voltages V+ and V− applied thereto. The output of the switch is applied to resistors 129 and 130.

An integrating circuit is coupled between resistors 129 and 130. The integration circuit essentially reconstructs the digital signal which appears in the output of flip-flop 115 and feeds it back to differencing amplifier 114. The integrating network comprises resistor 116, capacitor 117, resistor 118 and capacitor 119. The parameters of the resistors and capacitors are preferably selected to perform either single integration or double integration depending on the characteristic of the input signal. The relative resistances of resistors 129 and 130 are selected so that the current that flows into the integrating network when switch 128 is in the binary 1 state is equal to the current that flows out of the integrating network when the switch 128 is in the binary 0 state.

If the signal which is reconstructed and fed back to the differencing amplifier 114 is more positive than the input video signal from the sampled channel, the output of the differencing amplifier is equivalent to a digital binary 1. The flip-flop which was reset by the previous clock pulse, is thereby set to generate a binary 1 output. If the signal which is reconstructed and fed back by the integrators is more negative than the input video signal from the sampled channel, the output of the differencing amplifier is equivalent to digital binary 0. The flip-flop, which was reset by the previous clock pulse, remains in the binary 0 state to yield a binary 0 output.

Thus, when the slope of the video signal from the sampled channel is positive, the digital output signal of flip-flop 115 is 1 which represents a "positive" value. Correspondingly, when the slope of the video signal from the sampled channel is negative, the digital output signal is 0 which represents a "negative" value. When the slope of the video inputs signal is 0, the digital signal comprises an equal number of 1 and 0 pulses corresponding to the clock pulses to provide an average of 0. The output of the delta modulator is thus a train of pulses indicating both the magnitude and sign of the sampled video signal.

The digitized video signals generated by the delta modulator are fed to the digital signal input of the synchronizing code generator shown in FIg. 4. Each frame of digital pulses from the delta modulator is shifted through the synchronizing code generator preceded by a code word generated in the manner described above.

The train of digital pulses is fed by the output of flip-flop 47 to a modulator/transmitter 19 which modulates them on the carrier of a suitable radio transmitting wave. The data is transmitted over an appropriate communication channel to the receiver/demodulator 21 which essentially extracts the stream of data bits from the radio frequency carrier wave to utilize the information content in the bits for display of the terrain or object scanned by the scanner and recordation of the display.

The digital signals extracted from the carrier wave by the receiver/demodulator 21 are transmitted to both the frame synchronizer decoder 27 and the delta demodulator 22. The receiver/demodulator 21 also extracts clock pulses from the carrier wave to synchronize the operation of the elements at the receiver station.

Figure 6:
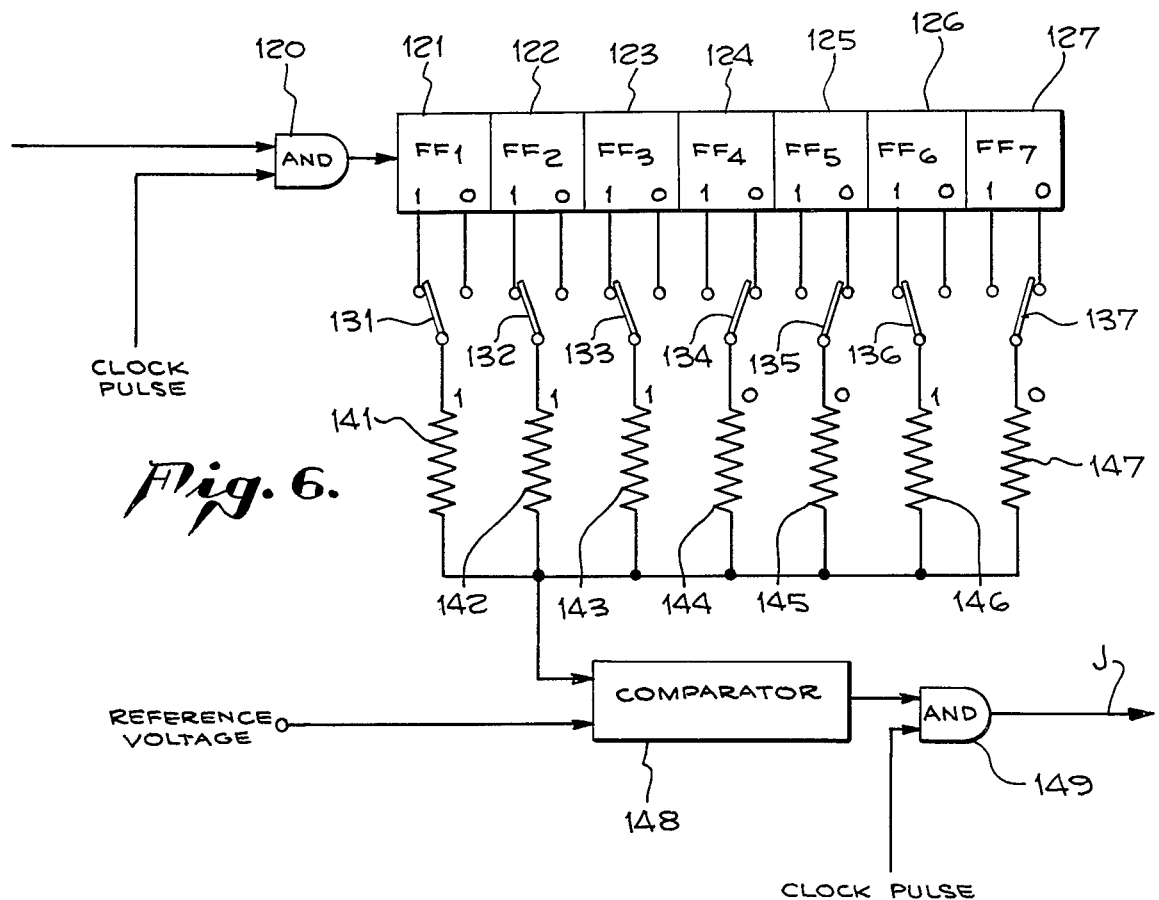
FIG. 6 is a functional block diagram of a frame synchronizing decoder that may be utilized in the system of the present invention.

Initially, the frame synchronizer decoder decodes the synchronizing word generated by the synchronizing code generator 14 to begin the scanning of each frame of data on the CRT 26. The frame synchronizer decoder as shown in FIG. 6 initially receives the digital signals at one input of AND gate 120. The gate is activated by a clock pulse applied to the second input of AND gate 120. The frame synchronizer decoder is shown as constructed of a plurality of flip-flops equal in number to the number of code bits and plurality of decoder resistors each associated with one of the flip-flops. It should be emphasized however that the frame synchronizer decoder may be any suitable decoding device.

The decoder is shown having a register of seven flip-flops 121 through 127 each having a binary 1 and binary 0 output terminal. Each flip-flop is coupled to an associated switch contact 131 through 137 respectively with each switch contact coupled to an associated resistor 141 through 147 respectively.

The switches 131 through 137 are set to contact the associated flip-flop in a sequence of ones and zeros identical to that of the code switches 16. Thus, when the seven digits of the code word each in the associated flip-flop 121 through 127, a voltage is applied to each of the associated resistors 141 through 147 the sum of which is applied to a comparator 148. A reference voltage is applied to the second input of the comparator 148. The reference voltage is pre-set to a level just below the voltage level applied to comparator 148.

When the voltage on each of the resistors 141 through 147 is high due to the presence of the code word in the register of flip-flops 121 through 127, comparator 148 generates an output signal which is applied to one input of AND gate 149. A clock pulse activates AND gate 149 to generate a recorder start pulse j shown in FIG. 8.

The recorder start pulse is applied to horizontal oscillator 28 to control the X drive k as shown in FIG. 8 through deflection plates 31 of the CRT. It will be recalled that the X direction corresponds to the horizontal direction perpendicular to the forward direction of the aircraft on which the detector array is mounted. The recorder start pulse is also applied to the up-down counter 29 to control the Y drive l as shown in FIG. 8. It will be recalled that the Y direction corresponds to the horizontal direction parallel to the forward direction of the aircraft on which the detector array is mounted. Thus, the CRT 26 displays a picture which will be seen by an observer standing in the aircraft facing forward and looking directly downward at the terrain below.

Figure 7:
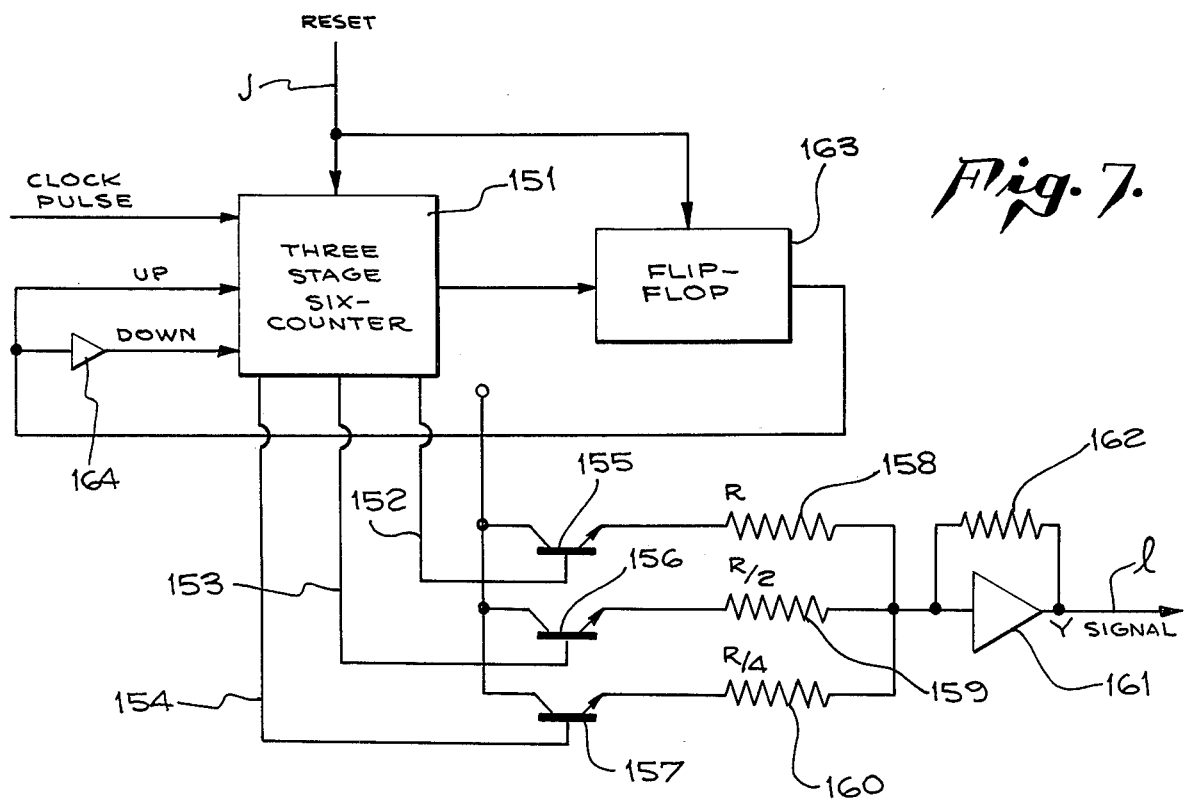
FIG. 7 is a functional block diagram of an up-down counter that may be utilized in the system of the present invention.

The up-down counter may be any suitable device for providing the sequential vertically up and subsequent vertically down Y drive *l* as shown in FIG. 7 as comprising a three stage six-counter 151 with a reset input from the decoder 27 and a clock pulse input from the receiver/demodulator 21. The counter has three outputs 152, 153 and 154 each coupled to an associated transistor switch 155, 156 and 157. Each of the switches is coupled to an associated resistor 158, 159 and 160. The resistance of resistor 158, 159 and 160 are selected to be in a binary progression such that resistor 159 is one half of the resistance of resistor 158 and the resistance of resistor 160 is one half of that of resistor 159. The outputs of the three resistors are coupled to a summing operational amplifier 161 having a feedback resistor 162 to provide the sequentially varying output.

In the operation of the up-down counter, the recorder start pulse *j* initially resets the three stage six-counter 151 and the flip-flop 163 at the beginning of each frame of scan. The output of flip-flop 163 is coupled to the up reset input of the counter 151 and through inverter 164 to the down reset input. Flip-flop 163 sets the counter 151 in the up state initially and clock pulses applied to counter 151 step the counter up to provide a sequentially stepped Y output voltage *l* shown in FIG. 8 between time $t_7$ through time $t_{12}$. When the counter 151 reaches the highest stage, flip-flop 163 is activated by the counter 151 to transmit a pulse which is inverted by inverter 164 to set the down input to the counter 151. The counter is then stepped down as shown in FIG. 8 to provide a sequential Y drive in the vertically downward direction. At the end of the down count, flip-flop 163 is activated again by counter 151 to set the up terminal of the counter 151 to begin the up count again.

The up-down counter 29 thereby controls the Y signal which is summed by analog summing device 32 with an output signal from vertical oscillator 34. The frequency of oscillator 34 is controlled by the forward motion signal 33 to provide proper spacing between the horizontal sweeps on the CRT for variable V/H. The Y signal is then applied to plates 36 to control the vertical deflection on the screen of the CRT 26. Thus, the up-down counter 29 controls the Y drive to provide a display on the CRT 26 of the pictorial information in the video signals transmitted by the analog signal gates 11 from the detector array 10 to the delta modulator 13 in accordance with the sequence of sampling of the analog signal gates 11 by the switch logic generator 12.

With the horizontal and vertical drives synchronized to provide a sweep in accordance with the sequence of sampling by the switch logic generator 12 of the analog signal gates 11, the CRT is now ready to display the video signals in the frame of scan. The digitized video signals received by the receiver/demodulator 21 are converted to an analog video signal, similar to the analog video signals sampled by the analog signal gates 11, by the delta demodulator shown in the preferred embodiment in FIg. 5. The delta demodulator may be any suitable demodulator for converting digital signals to analog signals such as the type shown in the Schindler article, cited above. The delta demodulator must, however, have similar circuit parameters in the voltage divider and integrating networks as the corresponding parameters in the delta modulator to provide fidelilty in reconverting the digitized video signals to an analog signal similar to the analog signals converted by the delta modulator to digital signals.

Figure 5:
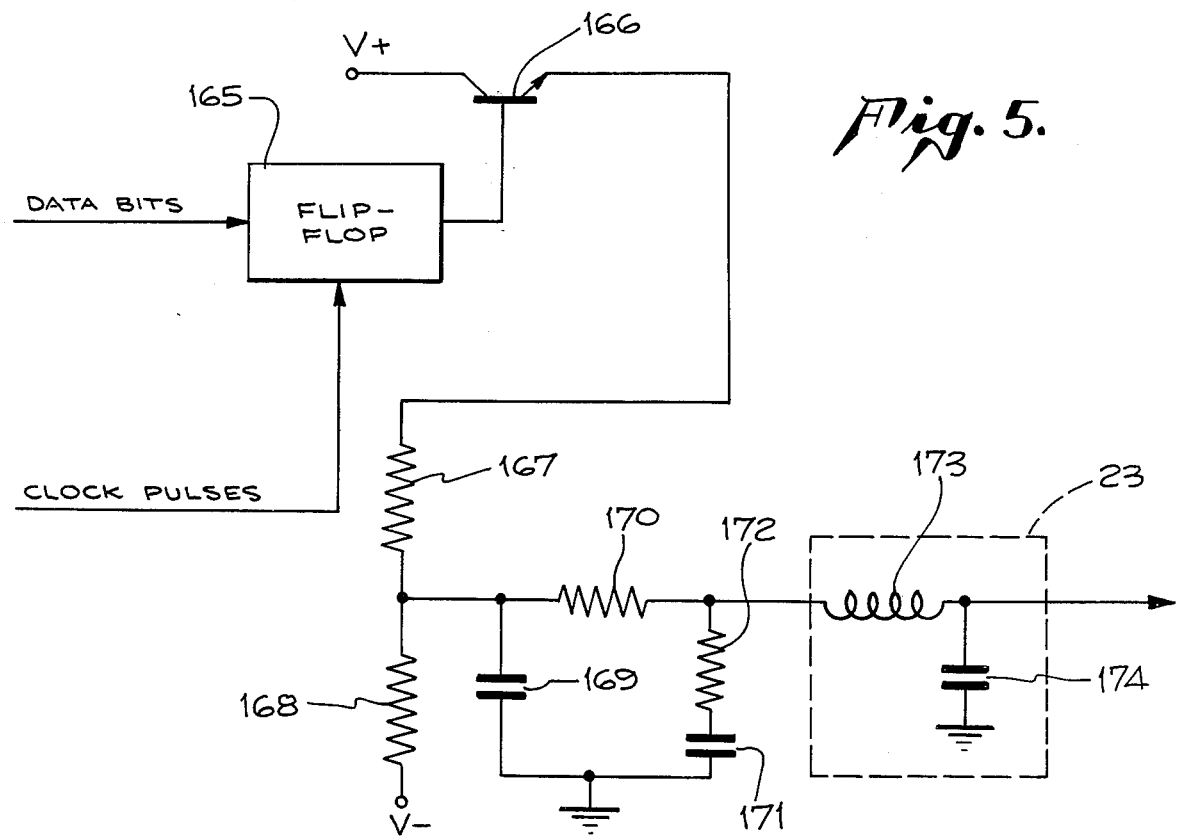
FIG. 5 is a functional block diagram of a delta demodulator that may be utilized in the system of the present invention.

The data bits are transmitted to flip-flop 165 of the delta demodulator shown in FIG. 5. The output of the flip-flop 165 is coupled to a transistor switch 166. The reference voltages are applied to the switch 166 and the output of the switch is coupled to resistors 167 and 168. An integrating circuit is coupled between resistors 167 and 168. The integrator comprises capacitor 169, resistor 170, capacitor 171 and resistor 172. The time constants of the capacitor-resistor networks are adjusted to perform a single or double integration function to match that of the delta modulator. The capacitor-resistor networks thereby accumulate electrical energy from the digital data bits with respect to time to provide an analog signal similar to the analog signals converted by the delta modulator 13 to digital signals.

In the operation of the delta demodulator, the flip-flop 165 is set at each clock pulse. The output of the flip-flop 165 activates the transistor 166 to switch it between the binary 1 and binary 0 states depending on whether the digital input signal to the flip-flop 165 is a binary 1 or a binary 0. The activation of switch 166 by the sensing of a binary 1 provides a voltage to the integrating circuit by virtue of the action of the resistor network 167 and 168. The relative resistances of resistors 167 and 168 are selected so that the current that flows into the integrating network when switch 166 is in the binary 1 state is equal to the current that flows out of the integrating network when the switch 166 is in the binary 0 state in a manner similar to the operation of the resistance network 129 and 130 of the delta modulator.

Thus, a binary 1 in the train of data bits increases the magnitude of the analog signal generated by the integrating network. A binary 0 in the data bits decreases the magnitude of the analog signal generated by the integrating network. As a result, the output of the integrating network is a reconstruction of the composite video signal generated by the sequentially sampled analog signal gates 11. The delta demodulator is thereby operative to convert the video signals encoded by the delta modulator 13 back to their original form.

The signals are passed through low pass filter 23 to eliminate extraneous high frequency signals. The filter 23 may be any standard filtering device. In the preferred embodiment it is shown as having an inductor 173 and a capacitor 174.

The video signals from the low pass filter 23 are applied to the grid terminal 24 to modulate the intensity of the picture displayed on the screen of CRT 26. Thus, the information content of the train of data bits provides modulation of the intensity of the beam to provide a picture of the terrain sensed by the scanners. As indicated above, the movement of the beam on the CRT 26 is synchronized in the X and Y directions to provide spacial relationship of the frames of scan which is identical to the spacial relationship of the pictorial information content of the sampled video signals transmitted by the analog signal gates 11 from the detector array 10 to the delta modulator 13.

Thus, the present invention provides for a display on the CRT 26 of a picture observed by the detector array 10 by sampling the detector sequentially from lowest order to highest order and subsequently from highest order to lowest order. This sequence of sampling the video signal obtained from each detector enables the utilization of one delta modulator which provides integration of each of the sampled signals to thereby generate a train of digital output signals indicative of the magnitude and direction of the sensed signals. Since the delta modulator provides a comparison of the output signal with the next succeeding input signal by feedback, the sequential sampling of each video signal having pictorial information content which is physically adjacent to the pictorial information of the next succeeding sampled video signal permits utilization of one delta modulator. This avoids the requirement of one delta modulator per detector channel which similarly employed prior art devices require.

Obviously, many modifications and variations of the present invention are possible in light of the above teachings. For example, the switch logic generator 12 may be any suitable device for multiplexing the analog signal gates 11. Both the synchronizing code generator 14 and the frame synchronizing decoder 27 may be any suitable encoding and decoding devices respectively for generating a unique code word at a transmission station and decoding it at the receiving station.

In addition, the up-down counter 29 may be any suitable counter for generating a sequentially ascending or descending signal in accordance with the sampling by the switch logic generator of the analog signal gates.

In particular, the present invention has been shown in the drawings and described in the description of the preferred embodiment as having only six analog signal channels. This limitation to six channels is for simplicity in description only. The substantial efficiency afforded by the utilization of one delta modulator in the present invention is particularly great when the number of channels is relatively substantial, such as in the order of 128. Any embodiment of the invention may be constructed, in the light of the above teachings, with a switch logic generator and other related elements to accommodate the increased number of channels. It is therefore to be understood that within the scope of the appended claims, the invention may be practiced otherwise than as specifically described.

I claim:

1. A system for transmitting analog information sensed by a multi-channel sensor comprising:
   sensing means having a plurality of channels each adapted to sense an analog signal,
   sampling means for activating each of said channels in successive ascending order and subsequently in successive descending order, and
   a single analog to digital converter coupled to the outputs of each of said channels for providing a serial train of digital pulses indicative of the magnitude and polarity of said sampled signals.

2. The system as described in claim 1 and further comprising
   means for transmitting said serial train of digital pulses to a receiving station, and
   a receiving station having means for reconverting said serial train of digital pulses to said sampled analog signals.

3. The system as described in claim 2 and wherein said receiving station includes utilization means for utilizing the informational content of said sampled analog signals in accordance with the sampling of said channels in successive ascending order and subsequentially in successive descending order.

4. The system as described in claim 3 and wherein said utilization device includes a cathode ray tube for displaying the informational content of said sampled analog signals and having at least one plurality of deflection plates, and
   counting means coupled to at least one of said plurality of deflection plates for controlling the display of said sampled analog signals in accordance with the sampling of each of said channels in successive ascending order and subsequentially in successive descending order.

5. The system as described in claim 2 and wherein reconverting means comprises a single digital to analog converter for reconverting said serial train of digital pulses to an analog signal similar to said sampled analog signals.

6. The system as described in claim 5 and wherein said receiving station includes display means for displaying the informational content of said analog signal similar to said sampled analog signals in accordance with the sampling of said channels in successive ascending order and subsequentially in successive descending order.

7. The system as described in claim 6 and wherein said display means comprises a cathode ray tube having at least one plurality of deflection plates, and
   wherein said receiving station further includes counting means coupled to at least one of said plurality of deflection plates for controlling the display of the informational content of said analog signals similar to said sampled analog signals in accordance with the sampling of said channels in successive ascending order and subsequentially in successive descending order.

8. A system for transmission and display of video signals from a transmission station to a receiving station comprising
   scanner means having a plurality of channels each having an electro-optical detector associated therewith for generating an associated video signal,
   sampling means for activating each of said channels in a predetermined sequence of successive ascending order and subsequently in successive descending order to each generate a sample video signal,
   converter means for converting each of said sampled video signals into a single serial train of digital signals,
   transmission means for transmitting said single serial train of digital signals from the transmitting station to the receiving station,
   restoring means at the receiving station for reconverting said single serial train of digital signals to analog signals corresponding to said sampled video signals, and
   display means responsive to said analog signals for providing a plurality of frames of scan to thereby display said video signals.

9. The system as described in claim 8 and wherein said restoring means includes control means for controlling said display means to display said video signals in accordance with the sampling thereof by said sampling means in said predetermined sequence.

10. The system as described in claim 9 and wherein said control means includes a horizontal oscillator for controlling the horizontal movement of said frame of scan, and
   an up-down counter for controlling the vertical movement of said frame of scan in accordance with the sampling of said channels in successive ascending order and subsequently in successive descending order.

11. The system as described in claim 8 and wherein said sampling means comprises:
   a plurality of gates each associated with one of said channels, and
   switch logic generator means coupled to the input of each of said gates for enabling each gate in said predetermined sequence.

12. The system as described in claim 11 and further comprising means for generating a digital code word to be transmitted by said transmission means with said single serial train of digital signals for synchronizing the operation of said restoring means and said display means with respect to said scanning means and said sampling means.

13. The system as described in claim 12 and wherein said restoring means includes a delta demodulator for restoring said serial train of digital signals to an analog signal representative of said sampled video signals.

14. The system as described in claim 13 and wherein said restoring means further includes decoding means for controlling the initiation of a frame of scan of said analog signal of said display means.

* * * * *